July 2, 1963   A. H. ADAMS   3,096,131
ELECTRICAL BUS CONDUCTOR
Filed Jan. 3, 1961   3 Sheets-Sheet 1

INVENTOR.
ALBERT H. ADAMS
BY Charles A. McClure
ATTORNEY.

July 2, 1963
A. H. ADAMS
3,096,131
ELECTRICAL BUS CONDUCTOR
Filed Jan. 3, 1961
3 Sheets-Sheet 2
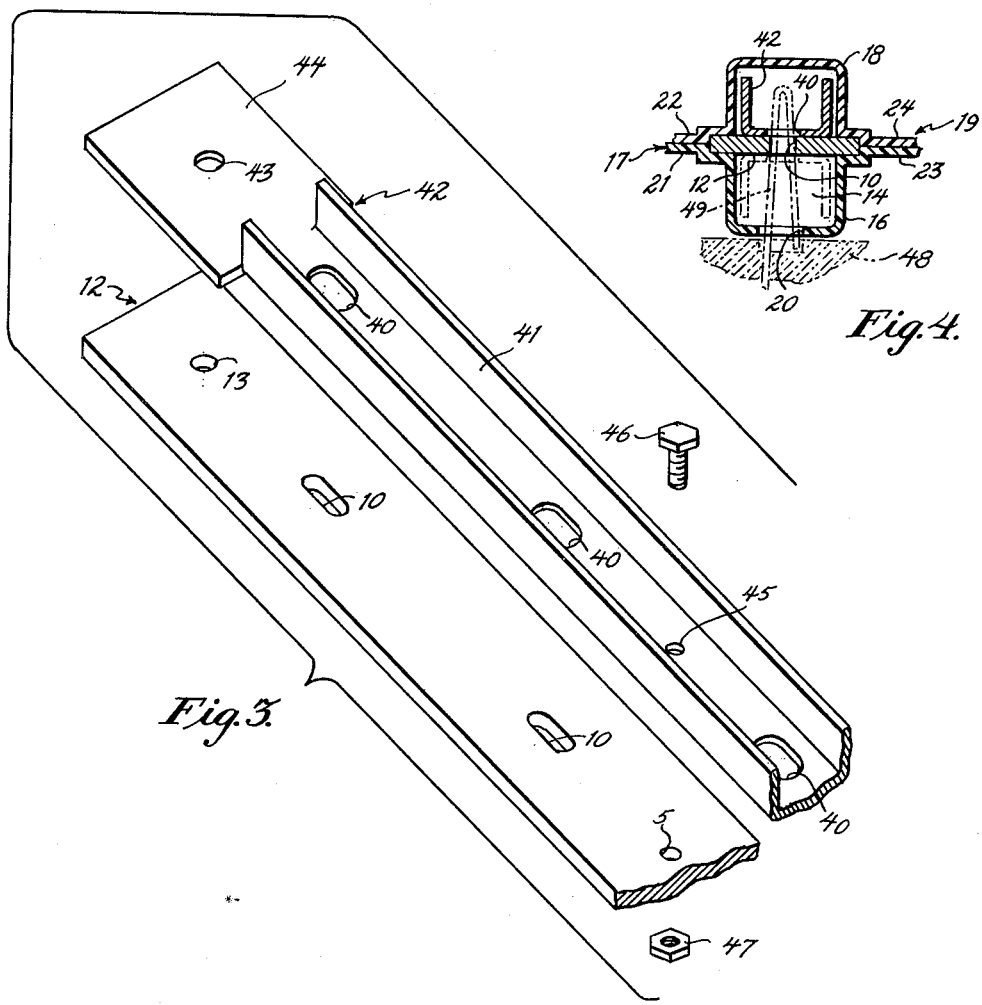
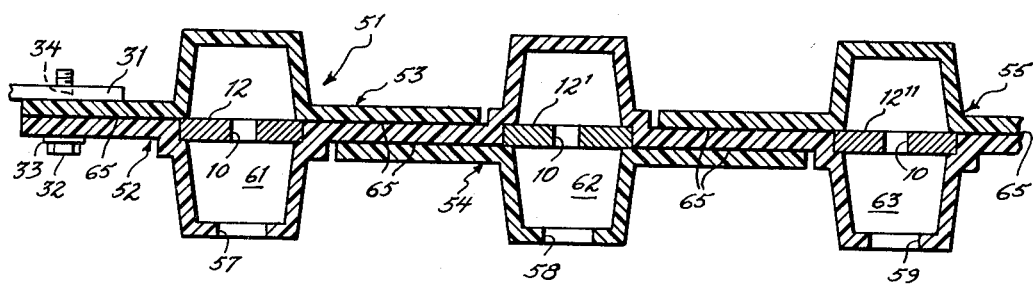
INVENTOR.
ALBERT H. ADAMS
BY
Charles A. McClure
ATTORNEY.

July 2, 1963

A. H. ADAMS 3,096,131

ELECTRICAL BUS CONDUCTOR

Filed Jan. 3, 1961

INVENTOR.
ALBERT H. ADAMS
BY
*Charles A. McClurg*
ATTORNEY.

United States Patent Office 3,096,131
Patented July 2, 1963

3,096,131
ELECTRICAL BUS CONDUCTOR
Albert H. Adams, Simsbury, Conn., assignor to General Electric Company, a corporation of New York
Filed Jan. 3, 1961, Ser. No. 80,112
8 Claims. (Cl. 339—22)

This invention relates to electrical distribution systems, concerning especially insulated busways. In certain of its broader aspects the invention herein described is described and claimed in continuation-in-part application Serial Number 135,880 filed September 5, 1961, by A. H. Adams and W. F. Olashaw and assigned to the assignee of the present invention.

Systems for distribution of electric current, whether direct or alternating, to a multiplicity of motors or other load devices require heavy-duty conductors of bus type, which may be in the form of essentially flat bars or may take more complex configurations. If left uninsulated or supported only partly insulated, as is common, bus conductors connected to a source of electrical potential pose an appreciable hazard to operating personnel, who may have occasion to make or break connections thereof to motor starters or similar devices, as well as presenting a risk of damage to associated equipment in the event of overload or improper connection. Most bus-supporting insulators are effective dust-catchers and breeding places for short circuits, and the intervaled support so provided is conducive to misalignment of the supported bus conductors, with consequent likelihood of faulty connection therewith by stabs or other probe connectors.

A primary object of this invention is provision of an insulated busway permitting ready access to the interior thereof.

An object is combined longitudinal insulation and support of a bus conductor in an electrical distribution system.

A particular object is provision of a multiple busway envelope capable of supporting a plurality of bus bars and isolating them from one another.

An object is construction of an essentially dead-front busway adapted to carry an auxiliary bus conductor, as well as a principal bus, and to receive electrical probes for connection therewith.

A further object is provision of an insulated busway adapted to accommodate auxiliary bus conductors fore and aft of a principal bus conductor.

Other objects of this invention, together with ways and means of attaining the various objects will be apparent from the following description and the accompanying diagrams.

FIG. 3 is an exploded perspective view of a principal and an auxiliary bus conductor and means for attaching them to one another;

FIG. 4 is a fragmentary sectional plan of a busway, as in FIG. 2, accommodating the bus conductors of FIG. 3;

FIG. 5 is a sectional plan of a modification of electrical distribution apparatus according to this invention.

In general, the objects of the present invention are accomplished by providing, in an electrical distribution system, an insulating envelope having opposing faces, preferably composed of a plurality of sheets of insulating material juxtaposed to one another, configured to accommodate therebetween one or more bus conductors over a substantial part of the longitudinal extent of the conductors. Each such busway is made up of a channeled portion of at least one such insulating face or sheet, which is adapted to fit snugly about the oppositely extending side edge portions of a bus conductor so as to space it away from the bed of the channel and is adapted to accommodate auxiliary bus conductors therein. The insulating envelope is further adapted, as by the presence of apertures therein communicating with the interior, to receive probes for electrical contact with a conductor in each busway so provided, and such probe-receiving portion is preferably similarly channel-shaped so that opposing channeled portions make up such busway and render it symmetrical fore and aft. It will be apparent that the principal conductors, conveniently shown and described herein as flat and called bus "bars," may comprise other elongated structures characterized by oppositely extending side edge portions, preferably flat and essentially coplanar, adapted to be sandwiched between the insulating sheet portions.

Figure 1:
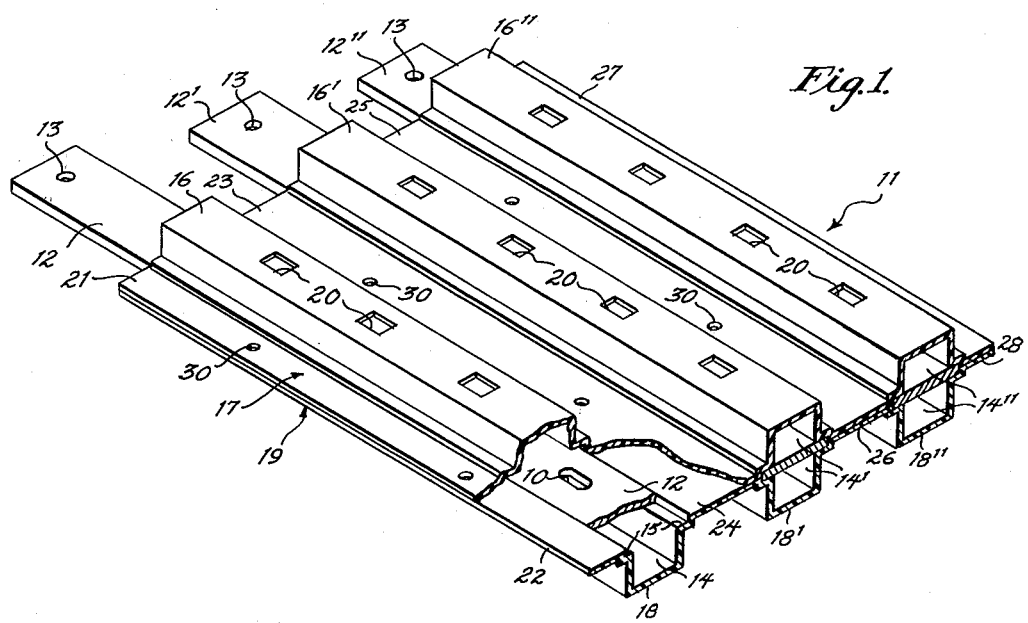
FIG. 1 is a perspective view, partly cut away, of electrical distribution apparatus of the present invention.

FIG. 1 shows, in isometric perspective, multiple busway envelope 11 about three bus bars 12, 12', 12", all of like cross section. The respective bus bars are accommodated in individual busways 14, 14', 14", provided by juxtaposition of oppositely channeled insulating cover sheet 17 and backing sheet 19 comprising the envelope. The head ends of the respective bus bars protrude to various extents from their busways and have boltholes 13 therein (one each) so as to facilitate connection to transversely extending main power busses, for example. Upwardly channeled portions 16, 16', 16", of cover sheet 17 overlie downwardly channeled portions 18, 18', 18", of backing sheet 19. The cover sheet also comprises a base portion made up of left and right edge flanges 21 and 27 adjacent respective channeled portions 16 and 16", together with essentially coplanar intermediate flat portions 23 and 25 between channeled portions 16 and 16' and channeled portions 16' and 16", respectively. The corresponding base portion of the backing sheet is made up of opposing coplanar flanges 22 and 28 and intermediate flat portions 24 and 26, which are contiguous with the respective opposing parts (21, 23, 25, and 27) of the cover sheet. Each channeled portion of the cover sheet is provided with a row of apertures 20 spaced therein at regular intervals, along the channel bed, for the purpose of receiving electrical probes therethrough, differing only in this respect from backing sheet 19.

The lower left part of FIG. 1 is progressively cut away to show the interior construction. Bus bar 12 visible therein has aperture 10 centered widthwise thereof and elongated somewhat in the lengthwise direction. Although this is the only such aperture visible in this view, each of the bus bars has a row of such apertures 10 spaced similarly to (but individually somewhat narrower than) apertures 20 in the overlying channeled portions of the cover sheet, of which 16 is partially cut away to show this particular feature in the underlying bus bar. The bus bar itself is partially cut away to reveal steplike indentations 15 in the sides of channeled portion 18 of the backing sheet along the junctions thereof with left flange 22 and intermediate flat portion 24 flanking the channel opening. Each channeled portion of each of sheets 17 and 19 is similarly indented or recessed perpendicularly to the base portion for substantially half the thickness of the side edge of a bus bar, and laterally (parallel to the base portion) for a minor fraction of the bar width. The respective sheets thus sandwich each of the bus bars in place between them, holding them spaced laterally and isolated from one another by the contiguous intermediate portions of the sheets. Both sheets have holes 30 therethrough at spaced intervals along the various base portions, i.e., in the flanges and intermediate flat portions, to receive bolts or similar fasteners (not shown in this view) to hold those opposing portions of the respective sheets in contiguity with one another.

Figure 2:
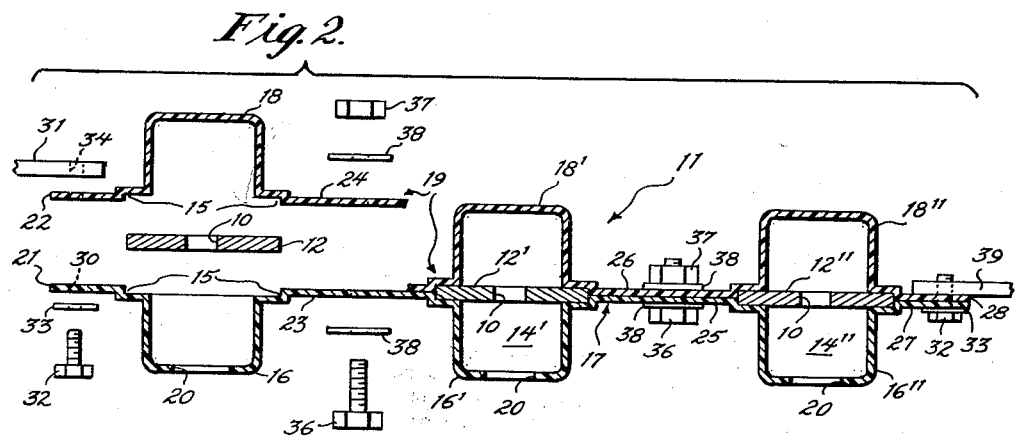
FIG. 2 is a transverse sectional plan, with a portion thereof exploded, of the apparatus of FIG. 1 with addition of fastening and side-supporting means.

FIG. 2 shows, in sectional plan, the multiple busway envelope and bus bars of FIG. 1, together with portions of supporting structures 31 and 39 at the left and right, respectively, as well as bolts 32 and washers 33 to hold the respective flanges of the base portions of the sheets together and thereto, also bolts 36, nuts 37, and pairs of washers 38 to hold the intermediate flat portions of the respective base portions together. In the interest of clarity the left third or so of this view is in exploded form. Thus, at the far left, bolt 32 is shown removed from internally threaded opening 34 (broken lines) in support 31, as well as from washer 33, while flanges 21 and 22 of cover and backing sheets 17 and 19 are spaced from one another and from the members just mentioned; similarly, bolt 36 and nut 37 and intervening washers 38 are spaced apart, with spaced flat intermediate portions 23 and 24 of the respective sheets located between and apart from the washers. Respective channeled portions 16 and 18, which go to make up the left busway, are spaced from intervening bus bar 12. Steplike indentations 15 in the respective channeled portions are clearly visible in this view.

The remaining major part of FIG. 2 shows the multiply channeled or generally corrugated cover and backing sheets juxtaposed, with the respective base portions contiguous with one another and with their opposing channeled portions forming busways 14' and 14", about respective bus bars 12' and 12", each of which has aperture 10 therein opposite aperture 20 in the bed of the adjacent channeled portion of the cover sheet; each of these bus bars is retained halfway between the beds of the respective opposing channeled portions by fitting snugly into the indentations at the junctions of the channel walls with the flat intermediate base portions of the sheets. Intermediate flat portions 25 and 26 are held contiguous with one another by bolt 36 fitted with nut 37 and washers 38, and right edge flanges 27 and 28 are retained together similarly by bolt 32 fitting through washer 33 and through the flanges and threaded into support 39.

FIG. 3 shows, fragmentarily in perspective and exploded, principal bus bar 12, as was employed in the preceding views, and somewhat thinner auxiliary bus conductor 42, as well as bolt 46 and nut 47 for fastening them together through holes 5 and 45 provided for that purpose in the respective bus members. The auxiliary bus has relatively narrow channeled portion 41 extending for most of its length and terminating in flat head 44 of substantially the same width as that of bar 12. This head end of the auxiliary bus conductor has bolt hole 43 therein to register with bolt hole 13 in the head end of the bus bar. The bed of channeled portion 41 of the auxiliary bus conductor has relatively wide probe-receiving apertures 40 to register with narrower elongated probe-receiving apertures 10 spaced along the center of the bus bar. Holes 5 and 45 for the bolts to fasten the principal and auxiliary bus members together are spaced between the respective probe-receiving apertures. As is apparent from the relative widths of the bus members and their respective orientations in this view, when fastened together they are back-to-back, i.e., with the channeled portion of the auxiliary bus conductor opening away from the principal bus bar itself.

FIG. 4 shows, in fragmentary sectional plan, a single busway from the insulating envelope previously shown, with channel-shaped auxiliary bus conductor 42 of the last preceding view in place therein in conjunction with principal bus bar 12. The auxiliary bus conductor is located in the rear half, constituted by channeled portion 18 of backing sheet 19, of busway 14, whose front half is constituted by channeled portion 16 of cover sheet 17. Shown in phantom in the busway front half is a like auxiliary bus conductor oriented with the outer surface of its channel contiguous with the front face of the principal bus just as the corresponding part of the rear auxiliary bus is contiguous with the back of the principal bus. Of course, auxiliary bus conductors may be similarly employed in the previously illustrated busways, either fore or aft of the principal bus therein or in both such locations. Also shown in phantom is an electrical probe made up of insulating block 48 supporting V-shaped stab 49 protruding from it into and through aperture 20 in the bed of the channeled portion of the cover sheet and through successive apertures in the principal and auxiliary bus members, the apex of the V terminating before reaching the bed of rear channeled portion 18 of the backing sheet.

FIG. 5 shows, in sectional plan, modified insulating envelope 51, comprising alternately disposed (to front and rear) channeled main insulating sheet 52 and three singly channeled caplike insulating sheets 53, 54, 55, each with opposing coplanar flanges flanking the channeled portion thereof. These three cap sheets are identical in configuration and differ only in the presence or location of probe-receiving apertures and boltholes. If the cap sheets were to be assembled to the main sheet by bolting, as they might be, similarly to the previously illustrated embodiment, each of the cap sheets might have a pair of boltholes in its opposite flanges, and the base portions of the main sheet would be correspondingly apertured. Also, both the cap sheets and the rear channel of the main sheet could be apertured to receive electrical probes in like manner to the corresponding front parts, if desired, in which event the cap sheets would be wholly identical.

In the embodiment illustrated in FIG. 5, in which the sheets are adhesively secured, cap sheets 53 and 55 differ from one another only in the minor respect that the left flange of 53 has a hole (not indicated) receiving bolt 32 through washer 33 to fasten it to supporting structure 31 by threading into opening 34 therein (shown in broken lines), whereas a corresponding bolthole would be in the right flange (broken away) of cap sheet 55 unless the envelope should provide more than the three aligned busways shown; cap sheet 54 has no such hole in it, while probe-receiving aperture 58 is provided in the bed of its channel. The main insulating sheet, which is shown with two frontwardly channeled portions and an intermediate rearwardly channeled portion, has like probe-receiving apertures 57, 59 through such frontwardly channeled portions at the left and right, respectively. In all the insulating sheets in this view the bed of each channeled portion is narrower than the channel opening between the flanges or intermediate base portions so that from the exterior the channeled portions appear mildly beveled.

As is apparent from FIG. 5, the steplike indentations in which respective bus bars 12, 12', 12" are fitted are present only in the sides of the channeled portions of main sheet 52; the flanges of the cap sheets joining their channel walls at nearly a right angle (modified only by the mentioned beveling). Each flange of each cap sheet is contiguous with either a flange of the main sheet or a flat base portion thereof intermediate an adjacent pair of the three busways 61, 62, 63 formed by the opposing channeled portions of the main sheet and the respective cap sheets. Instead of being bolted at the intermediate locations the contiguous faces are retained together by means of thin striplike layers of adhesive 65, also conveniently used between the flanges at the extreme left and right. It will be apparent that the leakage pathway along intervening surfaces between adjacent bus bars is much greater in in such construction than where a bolt is inserted therebetween. As in the previously described embodiment, auxiliary bus conductors can be accommodated in the enclosed rearwardly (or forwardly) disposed channel-shaped portions of envelope 51 without disturbance of the essentially dead-front condition provided by the channel-shaped portions disposed frontwardly from the bus bars.

Figure 6:
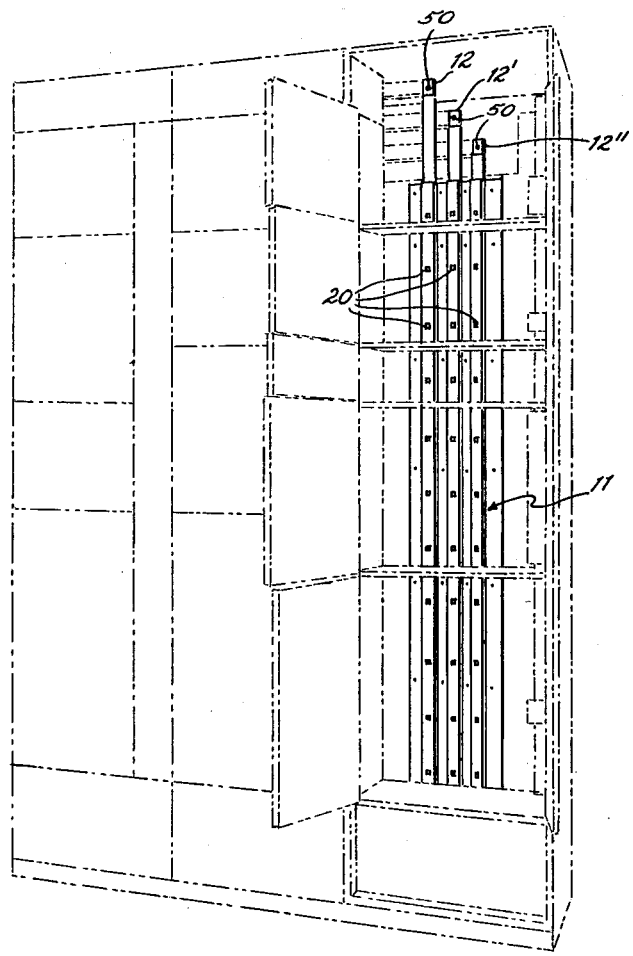
FIG. 6 is a perspective view of the apparatus of FIG. 1 shown in place as a component of a motor control center or the like, the cabinet and associated features thereof being shown in phantom.

FIG. 6 shows, in perspective, busway envelope 11 in place as a component of a control center represented in phantom as a surrounding cabinet and associated elements, including doors located at modular intervals of height with regard to rows of apertures 20 in the busway channels. Bolts 50 connect variously protruding bus bars 12, 12', and 12" with respective transverse main bus bars, also shown in phantom. Three similar cabinet sections are shown side by side, with the doors of only the rightmost one opened to reveal the bus bars and surrounding busway envelope inside the cabinet. A cabinet assembly including such a busway envelope is described and claimed in the aforementioned application Serial Number 135,880.

The busway envelopes of this invention are readily constructed and assembled. Any suitable insulating material may be used in the composition of the envelope or its component sheets. A preferred general-purpose composition is polyester-resin reinforced with glass fibers or filaments. Epoxy or other synthetic resins can be employed, with or without fibrous reinforcement. Manufacture of sheets in desired form from such compositions, as by pressing or molding, is well known and requires no comment here. Suitable adhesives for the various compositions are also known in the art. Of course, the bus conductors are made of copper or other good electrical conductor, and the suggested fastening hardware for the sheets and bus conductors is wholly conventional. Any suitable construction of stab-in probes may be employed. Assembly of the various members in accordance with the foregoing description and accompanying diagrams for use in an electrical distribution system should be readily understood by anyone ordinarily skilled in the art.

Many advantages and benefits afforded by the present invention have been mentioned above or will be obvious in the light of what has been described and illustrated herein. The invention conveniently and economically provides an insulated lightweight busway envelope, which may provide for any number of individual busways (three being a convenient number for conventional three-phase A.-C. use) to support individual or combination bus conductors over substantially their entire length, each busway being completely isolated from the others. Each busway can accommodate a plurality of auxiliary conductors. The busway envelope is readily supportable by fastening at its side edges to a suitable supporting structure, and no other support for the bus conductors sandwiched therein is necessary or desirable. The likelihood of inadvertent contact with a conductor contained in such a busway is minimized, as is the possibility of short-circuiting between conductors in adjacent busways. The entire assembly is free from dust-collecting surfaces and facilitates convective cooling of the bus conductors therein. Other benefits of practicing this invention will accrue to and be understood by those undertaking to do so.

It will be apparent that changes may be made in the specific apparatus without involving a departure from the claimed invention. Such variations as are specified herein are suggestive only and not intended as exhaustive of the possible modifications inherent within or compatible with the present inventive concept.

The claimed invention:

1. Electrical distribution apparatus comprising oppositely channeled insulating sheets juxtaposed to one another with their respective channeled portions opposing one another for defining a busway therebetween, the flanking portions of the respective sheets being contiguous with one another, at least one of the channeled portions being indented interiorly and thereby adapted to accommodate the side edge portions of a bus conductor located in the busway and to space it from the bed of the channel, the opposing portions of the other sheet being spaced from the indented portions of the opposing sheet by the thickness of the accommodated edge portions of the bus conductor and thereby adapted to cooperate therewith to retain the bus conductor in place therebetween, and the channeled portion of one of the sheets having apertures opening into the busway.

2. Electrical distribution apparatus comprising a pair of oppositely channeled insulating sheets juxtaposed to one another with their channeled portions opposing one another in busway-forming configuration, each of the sheets having essentially coplanar base portions flanking the channeled portion, the opposing base portions of the respective sheets being contiguous with one another, at least one of the sheets having a stepped transistion portion located between the channeled and base portions and adapted to accommodate the side edges of a bus conductor placed within the busway, and one of the sheets having spaced along the bed of its channeled portion a row of apertures opening into the busway.

3. Electrical distribution apparatus comprising a pair of similar insulating sheets, each sheet being multiply channeled, the portions of each sheet extending along the channeled portions thereof being essentially coplanar, each channeled portion of each sheet being contoured to receive the side edges of a bus conductor and space the conductor from the bed of the channel, the respective sheets being juxtaposed to sandwich bus conductors between the opposing channeled portions of the sheets, the coplanar portions of the respective sheets being contiguous with one another, access to each bus conductor so sandwiched being provided by apertures in at least one of the overlying channeled portions.

4. Electrical distribution apparatus comprising a pair of insulating sheets, a plurality of bus conductors aligned side by side, each having side edges adapted to be clamped between the pair of insulating sheets, the sheets being multiply channeled oppositely to one another and adapted to clamp a bus conductor between each opposing pair of channeled portions, the lateral portions of the respective sheets extending along the channeled portions thereof being essentially contiguous with one another, access to each bus conductor clamped between the sheets being provided by apertures in at least one of the overlying channeled sheet portions.

5. In an electrical distribution system, an insulated multiple busway comprising a multiply channeled insulating sheet in which adjacent channeled portions are disposed in opposite directions from essentially mutually coplanar adjacent portions, the interior of each channeled portion being terraced to fit against the edges of an essentially flat-edged bus conductor and to space the bus conductor away from the bed of the channeled portion with its exposed face essentially flush with the coplanar adjacent portions of the sheet; separate singly channeled insulating sheets for each of the channeled portions of the multiply channeled sheet, each of the singly channeled sheets having a channeled portion with width approximating the width of the channeled portion of the multiply channeled sheet, excluding the terracing thereof, and with essentially coplanar portions flanking the channeled portion and extending laterally for at most the width of a portion of the multiply channeled sheet adjacent a channeled portion thereof; and adhesive means sealing the flanking portions of the singly channeled sheets to the adjacent portions of the multiply channeled sheets, when juxtaposed with the channeled portions of the respective sheets oppositely disposed to form busways therebetween, the channeled portions of the sheets on one side of the multiple busway so formed having apertures communicating with the interior thereof.

6. Electrical distribution apparatus comprising a plurality of bus conductors, each having its opposite side edges essentially coplanar with one another, the side edges of adjacent conductors being parallel to and spaced laterally from one another, a pair of generally corrugated insulating sheets juxtaposed to one another and sandwiching the bus conductors, the side edges of each conductor fitting snugly between the respective sheets, with the intervening portion of the conductor covering a corrugation therein disposed outwardly from the adjacent portion of the conductor, the respective sheets having mutually contiguous portions extending substantially the length of the bus conductors and along the side edges of each conductor, thereby insulating each bus conductor generally from the exterior and especially from the other conductors over substantially their entire length, each bus conductor being accessible by way of an opening between the sheets at at least one end and through apertures present in an overlying insulating corrugation.

7. Electrical distribution apparatus comprising a flat bus conductor having generally parallel extending side edges, an insulated busway including a first insulating sheet having a channel with a bed and spaced side walls extending from the bed and formed with indentations which open at the open end of the channel, said first sheet having generally coplanar flanking portions flanking the open end of the channel, said conductor being spaced from the bed of the channel to extend across the open end of the channel with its side edges snugly received in said indentations, a second insulating sheet cooperating with said first sheet to sandwich and to support said conductor therebetween, said second sheet covering said conductor and having generally coplanar flanking portions contiguous with the flanking portions of the first sheet, said sheets extending substantially the entire length of the conductor and being contiguous with the side edges and with at least parts of the opposite faces of the conductor, and means securing the flanking portions of the two sheets together, one of the sheets having apertures therein to receive probes for contact with said conductor.

8. Electrical distribution apparatus comprising a plurality of flat bus conductors each having generally parallel extending side edges, and insulated busway including a first insulating sheet having a plurality of spaced channels each with a bed and spaced side walls extending from the bed, the side walls of each channel being formed with indentations which open at the open end of the channel, said first sheet having generally coplanar flanking portions flanking the open ends of the channels, each of said conductors being spaced from the bed of a separate channel to extend across the open end of the associated channel with its side edges snugly received in the associated indentations, a second insulating sheet cooperating with said first sheet to sandwich and support said conductors therebetween, said second sheet covering said conductors and having generally coplanar flanking portions contiguous with the flanking portions of the first sheet, said sheets extending substantially the entire length of the conductors and being contiguous with the side edges and with at least parts of the opposite faces of the conductors, and means securing the flanking portions of the two sheets together, one of said sheet having apertures therein to receive probes for contact with said conductors.

References Cited in the file of this patent
UNITED STATES PATENTS

| | | |
|---|---|---|
| 1,915,918 | Bostwick | June 27, 1933 |
| 1,945,731 | Cohen | Feb. 6, 1934 |
| 2,122,298 | Scott | June 28, 1938 |
| 2,372,267 | Frank et al. | Mar. 27, 1945 |
| 2,963,537 | Carlson et al. | Dec. 6, 1960 |